United States Patent
Nakamoto et al.

(10) Patent No.: US 6,275,360 B1
(45) Date of Patent: Aug. 14, 2001

(54) READ-WRITE HEAD

(75) Inventors: Kazuhiro Nakamoto; Takashi Kawabe, both of Hitachi; Tetsuo Kobayashi, Ooi-machi; Shun-ichi Marumi, Hitachi; Shinji Narishige, Naka-gun; Takao Imagawa, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/159,752

(22) Filed: Sep. 24, 1998

(30) Foreign Application Priority Data

Sep. 29, 1997 (JP) ............................................. 9-263244

(51) Int. Cl.$^7$ ...................................................... G11B 5/39
(52) U.S. Cl. ............................................ 360/319; 360/317
(58) Field of Search .................................... 360/317, 318, 360/319

(56) References Cited

U.S. PATENT DOCUMENTS

| | | | |
|---|---|---|---|
| 4,907,113 | * | 3/1990 | Mallary ................................ 360/112 |
| 5,103,553 | * | 4/1992 | Mallary .............................. 29/603.13 |
| 5,264,981 | * | 11/1993 | Campbell et al. .................... 360/126 |
| 5,493,464 | * | 2/1996 | Koshikawa ........................... 360/113 |
| 5,515,221 | * | 5/1996 | Gill et al. ............................. 360/113 |
| 5,555,147 | * | 9/1996 | Maruyama ........................... 360/113 |
| 5,582,927 | * | 12/1996 | Andricacos et al. . |
| 5,606,478 | * | 2/1997 | Chen et al. .......................... 360/126 |
| 5,621,592 | * | 4/1997 | Gill et al. ............................. 360/113 |
| 5,639,509 | * | 6/1997 | Schemmel ............................ 427/130 |
| 5,761,011 | * | 6/1998 | Miyauchi et al. .................... 360/113 |
| 5,763,108 | * | 6/1998 | Chang et al. ...................... 428/694 R |
| 5,838,521 | * | 11/1998 | Ravipati .............................. 360/113 |
| 5,850,325 | * | 12/1998 | Miyauchi et al. .................... 360/113 |

FOREIGN PATENT DOCUMENTS

| | | | |
|---|---|---|---|
| 6-084144 | * | 3/1994 | (JP) . |
| 8-212521 | * | 8/1996 | (JP) . |
| 9-293219 | * | 11/1997 | (JP) . |
| 10-214417 | * | 8/1998 | (JP) . |
| 11-066519 | * | 3/1999 | (JP) . |

\* cited by examiner

*Primary Examiner*—William Klimowicz
(74) *Attorney, Agent, or Firm*—Antonelli, Terry, Stout & Kraus, LLP

(57) ABSTRACT

A read-write head is capable of suppressing fluctuation on a reproduced waveform caused by repetition of a writing and reading operation, and is capable suppressing noise appearing in the reproduced waveform just after a writing operation is carried out. The read-write head has an upper magnetic core, an upper shield also serving as an lower magnetic core, a lower shield and a magnetoresistive film arranged between the upper shield and the lower shield. The upper shield has a soft magnetic film having a magnitude of anisotropy field of 5 to 30 Oe, or is a multilayer film composed of a high saturation magnetic flux density film and a negative magneto-striction film. The lower shield has a soft magnetic film having a magnitude of anisotropy field of 5 to 30 Oe.

4 Claims, 7 Drawing Sheets

(AMR)

(GMR)

READ-WRITE HEAD

BACKGROUND OF THE INVENTION

The present invention relates to a magnetoresistive read-write head of the type used for a magnetic recorder; and, more particularly, the invention relates to a read-write head incorporating a magnetoresistive read element having a magnetoresistive film arranged between a pair of shields.

A magnetic writing apparatus has a medium for magnetically writing information thereon, a read-write head composed of a write element for writing the information on the medium and a read element for converting a change in a magnetic field leaking from the medium on which the information is written, a circuit for controlling input and output signals, a mechanism for rotating or moving the medium, and a positioning mechanism for determining a position of the read-write head relative to the medium. The write element comprises a coil for generating a magnetic flux, a pair of magnetic cores for collecting the magnetic flux, and a write gap for generating a magnetic field, the write gap being provided between the pair of magnetic cores. The operation of writing information is performed by applying the magnetic field, generated by conducting pulse shaped write current to the coil, onto the medium. The read element comprises a pair of shields made of a soft magnetic film, a magnetoresistive film arranged between the pair of shields and spaced a certain distance from each of the shields, and a pair of leads electrically connected to the magnetoresistive film. The magnetoresistive film can be roughly classified into an AMR film utilizing an anisotropic magnetoresistive effect and a GMR film utilizing a giant magnetoresistive effect. For example, a permalloy (Ni-Fe) film having a thickness of 5 to 30 nm is used as the AMR film. The electrical resistance of the AMR film is changed depending on the angle between the magnetization direction and the direction of the applied current. There is not a proportional relationship between the applied magnetic field and the electric resistance. Therefore, in order to improve the linearity between the applied magnetic field and an output signal, bias films are often laminated and arranged near the AMR film. The GMR film comprises a first ferromagnetic film having a thickness of 2 to 10 nm, the magnetization direction of which is changed by the magnetic field leaking from the medium, a second ferromagnetic film having a thickness of 1 to 5 nm, the magnetization direction of which is almost fixed, and a non-magnetic film having a thickness of 1 to 4 nm, which is inserted between the first ferromagnetic film and the second ferromagnetic film. The second ferromagnetic film and an antiferromagnetic film for fixing the magnetization of the second ferromagnetic film are often directly laminated. The electrical resistance of the GMR film is changed depending on an angle between the magnetization direction of the first ferromagnetic film and the magnetization direction of the second ferromagnetic film. In order to improve the linearity between the applied magnetic field and an output signal, the magnetization direction of the second ferromagnetic film is often set so as to be nearly perpendicular to an air bearing surface. The GMR film can obtain a higher output even with a small magnetic field as compared to the AMR film. That is, the GMR film is more sensitive, and accordingly it is advantageous for high density writing by a magnetic writing apparatus. In the magnetic writing apparatus, a change in the electrical resistance in the AMR film or the GMR film is detected as an output signal. The pair of shields are provided for detecting the change of the magnetic field leaking from the medium with a high resolution. As the shield-to-shield spacing is narrowed, the resolution becomes higher. Therefore, the shield-to-shield spacing is being narrowed corresponding to the future trend toward a higher writing density. A permalloy (Ni—Fe) film, a permalloy base Ni—Fe—Nb alloy film, a sendust (Fe—Al—Si) film, a Co base amorphous film and the like are used as the shield on a side of a substrate (a lower shield). Since the surface of the sendust film is large in roughness, but is hard, a part of the film is hardly pealed off and attached onto some other portions during a process of lapping the air bearing surface. Since the film surface of the amorphous film is flat, the amorphous film is advantageous in a case where the gap between the shields is narrow or in a case where the GMR film is used, which is very sensitive to the roughness of the substrate. As the other shield, that is, an upper shield, a permalloy (Ni—Fe) film is often used. In order to reduce a displaced width between a position of the write gap and a position of the magnetoresistive film used for reading in the read-write head described above, one of the pair of magnetic cores of the write element in the side near the read element, that is, the lower core, is also used as the upper shield of the read element in most cases.

In order to attain a high writing density in the magnetic writing apparatus, it is indispensable to make the best use of a read-write head of magnetoresistive effect type. However, the read-write head of magnetoresistive effect type sometimes causes an error in the magnetic writing apparatus by fluctuation in the reading waveform when a writing and reading operation is repeated. One of the causes of such a fluctuation in the reading waveform is an instability in the shield. The structure of the magnetic domain of the shield is changed every time there is a writing operation. As the structure of the magnetic domain of the shield is changed, the magnetizing state of the magnetoresistive film is changed to cause the reading waveform to fluctuate. One method of suppressing the fluctuation in the reading waveform has been proposed, for example, in U.S. Pat. No. 5,515,221, in which an anti-ferromagnetic film is laminated under a soft magnetic film composing a shield, and uniaxial anisotropy in a direction of the track width (a direction on an air bearing surface and normal to film thickness) is applied to the soft magnetic film.

In the proposal disclosed in U.S. Pat. No. 5,515,221, the manufacturing process becomes more complex compared to that of a conventional head because the soft magnetic film and the anti-ferromagnetic film are laminated. Further, in order to apply the uniaxial anisotropy to the soft magnetic film, it is required to anneal it at a high temperature of nearly 320 for about 10 hours. When the laminated film structure is applied particularly to the shield on the side near the write gap (the upper shield), the head often does not operate normally because the characteristics of the magnetoresistive film become deteriorated in the process of the heat treatment described above. Further, in a GMR head in which the above-mentioned laminated film structure is applied to the upper shield, the magnetization direction (directed perpendicular to the air bearing surface by the anti-ferromagnetic film) of the second ferromagnetic film composing the GMR film and the magnetization direction (directed toward the track width by the anti-ferromagnetic film) of the shield are in a nearly orthogonal relation to each other. Therefore, the precedently fixed magnetization direction of the second ferromagnetic film is sometimes moved in a following process for fixing the magnetization direction of the shield (a magnetic field is applied under a somewhat high temperature) to deteriorate the characteristics of the head. It is very difficult to fix the magnetization directions so that they are different from each other, as described above.

In a case where the shield on the side near the substrate is of a construction including the amorphous film, there sometimes occurs a noise called a noise-after-write or a popcorn noise within approximately 100 µs after the writing operation. Since the film surface of the amorphous film is flat, the amorphous film is advantageous in a case where the gap between the shields is narrow or in a case where the GMR film is used, which is very sensitive to the roughness of the substrate. However, since the magnetic writing apparatus operates erroneously when the noise-after-write occurs, it is required to suppress the occurrence of such noise.

SUMMARY OF THE INVENTION

An object of the present invention is to provide a read-write head in which waveform fluctuation is suppressed by stabilizing the magnetic domain structure of the shields without using any anti-ferromagnetic film.

Another object of the present invention is to provide a read-write head in which the noise-after-write is suppressed.

A read-write head according to the present invention has an inductive write element including a coil for generating a magnetic flux, a pair of magnetic cores for collecting said flux and a write gap for generating a magnetic field, said write gap being arranged between said pair of magnetic cores; and a magnetoresistive read element including a pair of shields formed of soft magnetic films, a magnetoresistive film arranged between the pair of shields and a pair of leads electrically connected to the magnetoresistive film, wherein one or both shields of the pair of shields comprises a soft magnetic film having a magnitude of anisotropy field of 5 to 30 Oe. Particularly, the soft magnetic film is applied to the shield on a side near the write gap.

Further, one or both of the pair of shields are constructed with a multilayer film including a soft magnetic film having a magnitude of anisotropy field of 5 to 30 Oe. The soft magnetic film may be arranged at a position in the shield on a side nearest to the write gap, or a position on the shield in a side farthest from the write gap, or both positions. Particularly, it is effective to apply the multilayer film to the shield on the side near to the write gap. Further, it is effective to apply the multilayer film to the shield which is on the side near to the write gap and which contains an amorphous material.

The soft magnetic film having a magnitude of anisotropy field of 5 to 30 Oe can be obtained by employing, for example, an Ni—Fe—Co based alloy containing Ni of 80 to 90%, Fe of 10 to 20% and Co of 1 to 25% on the atomic ratio basis; or a Co—Fe—Ni based alloy containing Co of 90 to 95%, Fe of 5 to 10% and Ni of 1 to 30% on the atomic ratio basis; or a Co—Ni—Fe—Pd based alloy containing Co of 30 to 70%, Ni of 10 to 40%, Fe of 5 to 25% and Pd 5 to 20% on the atomic ratio basis.

In order to attain the above-mentioned objects, one or both of the pair of shields comprise a construction containing a multilayer film formed by laminating a soft magnetic film having a positive magneto-striction and a soft magnetic film having a negative magneto-striction. The multilayer film may have the following additional features.

(1) The magneto-striction is adjusted to a negative value on the order of $10^{-7}$.

(2) The magnitude of the anisotropy field of at least one soft magnetic film out of the soft magnetic films composing the multilayer is adjusted to a value of 5 to 30 Oe.

(3) The multilayer film is made of a material containing an Ni—Fe—Co based alloy, and the averaged ratio over the whole thickness direction of said multilayer film is adjusted to Ni of 80 to 90%, Fe of 10 to 20% and Co of 1 to 25% on the atomic ratio basis; or the multilayer film is made of a material containing a Co—Ni—Fe based alloy, and the averaged ratio over the whole thickness direction of said multilayer film is adjusted to Co of 90 to 95%, Fe of 5 to 10% and Ni of 1 to 30% on the atomic ratio basis; or the multilayer film is made of a material containing an Ni—Fe based alloy, and the averaged ratio over the whole thickness direction of said multilayer film is adjusted to Ni of 80 to 90% and Fe of 10 to 20% on the atomic ratio.

(4) The multilayer films are applied to the shield on a side near to the write gap, or the shield on the side near to said write gap and containing an amorphous material.

(5) A layer of the multilayer film nearest to the write gap is made of an Fe—Ni based alloy, and the ratio is adjusted to Fe of 55+d % and Ni of 45−d % on the atomic ratio basis where the range of d is −10 to +10%; or the layer of the multilayer film nearest to the write gap is made of a Co—Ni—Fe based alloy, and the ratio is adjusted to Co of 20 to 80%, Ni of 10 to 40% and Fe of 10 to 40% on the atomic ratio basis; or the layer of the multilayer film nearest to the write gap is made of a Co—Ni—Fe—Pd based alloy, and the ratio is adjusted to Co of 30 to 70%, Ni of 10 to 40%, Fe of 5 to 25% and Pd of 5 to 20% on the atomic ratio basis.

(6) The multilayer film formed by laminating a film made of the above-mentioned Fe—Ni based alloy; or the above-mentioned Co—Ni—Fe based alloy; or the above-mentioned Co—Ni—Fe—Pd based alloy; and a film made of an Ni—Fe based alloy, and the ratio is adjusted to Ni of 83 to 93% and Fe of 7 to 17% on the atomic ratio basis.

(7) The multilayer film formed by laminating a film made of the above-mentioned Fe-Ni based alloy; or the above-mentioned Co—Ni—Fe based alloy; or the above-mentioned Co—Ni—Fe—Pd based alloy; and a film made of an Ni—Fe—Co based alloy, and the ratio is adjusted to Ni of 83 to 93%, Fe of 7 to 17% and Co of 1 to 25% on the atomic ratio basis.

In order to attain the above-mentioned objects, a read-write head has a shield on a side near to the write gap out of the pair of shields which also serves as the magnetic core on a side near to the read element out of the pair of magnetic cores, and a layer of the magnetic core nearest to the write gap is formed of a multilayer film formed by laminating soft magnetic films having a saturation magnetic flux density larger than 1.2 tesla, wherein the magnetic core is formed with a multilayer film formed by laminating soft magnetic films having a positive magneto-striction and a negative magneto-striction.

In order to attain the above-mentioned objects, a read-write head has a magnetoresistive film which comprises a first ferromagnetic film, the magnetization direction of which is changed by a magnetic field leaking from the medium, a second ferromagnetic film, the magnetization direction of which is almost fixed, and a non-magnetic conductive film inserted between the first ferromagnetic film and the second ferromagnetic film, the second ferromagnetic film and an anti-ferromagnetic film for fixing the magnetization of the second ferromagnetic film being directly laminated to form a multilayer structure, wherein the above-mentioned shield is applied to the read-write head.

According to the above-mentioned arrangement, since the magnetic domain structure of the shield can be stabilized without using any anti-ferromagnetic film, it is possible to provide a read-write head which is easy to manufacture is low in cost, and has the ability to suppress the fluctuation in reproduced waveform caused by a repeated writing and reading operation and a noise-after-write, whereby it is also possible to suppress occurrence of errors in the operation of the magnetic writing apparatus.

DESCRIPTION OF THE PREFERRED EMBODIMENTS

[Embodiment 1]

Figure 1:
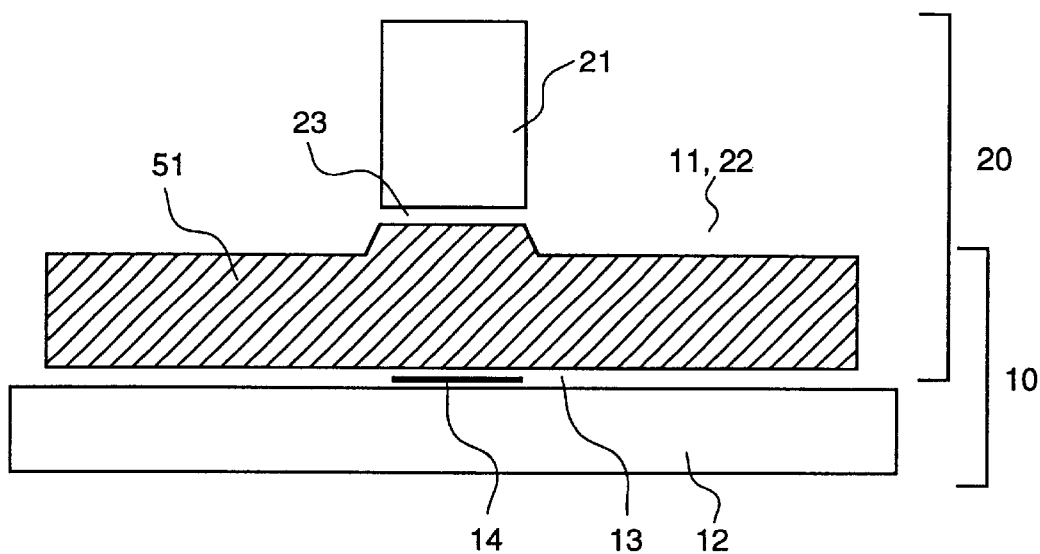
FIG. 1 is a diagrammatic view showing the air bearing surface of a read-write head of magnetoresistive effect type in accordance with the present invention.

FIG. 1 is a view showing the air bearing surface of an embodiment of a read-write head of magnetoresistive effect type in accordance with the present invention. The read-write head is manufactured by successively laminating a read element 10 and a write element 20 on a substrate.

The read element 10 has a portion just below an upper magnetic core 21 which is thicker than the other portions. An upper shield 11 made of $Ni_{74}Fe_{16}Co_{10}$ having a thickness of 3 μm, which also serves as a lower magnetic core 22 of the write element 20, and a lower shield 12 made of permalloy ($Ni_{82}Fe_{18}$) having a thickness of 2 μm are arranged opposite to each other through a reading gap 13 made of $Al_2O_3$ and $SiO_2$ having a thickness of 0.18 μm. A portion of the upper surface of the upper shield 11 not facing the upper magnetic core 21 is cut off to a depth of approximately 0.5 μm by etching. This is for reducing writing blur in a direction of the track width during writing. Further, magnetic anisotropy is applied in the direction of the track width to films used for the upper shield 11 and the lower shield 12. The magnitude of the anisotropy field is 10 Oe for the upper shield and 4 Oe for the lower shield. The magnitude of the anisotropy field for the upper shield is larger than that for the lower shield. In a portion near the center of the reading gap 13, a magnetoresistive film 14 and a pair of leads, not shown, are arranged in contact with the magnetoresistive film.

In the write element 20, the upper magnetic core 21, which is made of permalloy having a thickness of 3 μm, and a lower magnetic core 22 also serving as the upper shield 11 are arranged opposite to each other through a write gap 23 made of $Al_2O_3$ and $SiO_2$ having a thickness of 0.3 μm.

Figure 2A:
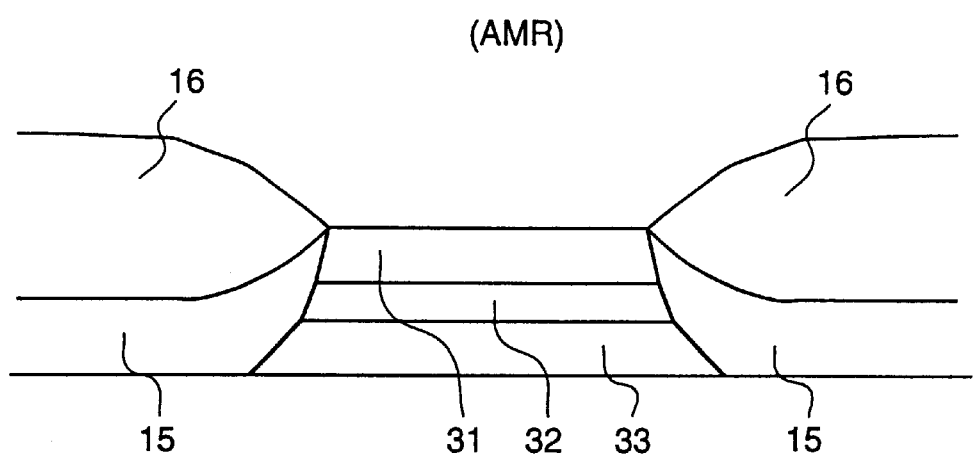
FIGS. 2A and 2B are enlarged diagrammatic views showing a portion of a magnetoresistive film on the air bearing surface of a read-write head of magnetoresistive effect type in accordance with the present invention.
Figure 2B:
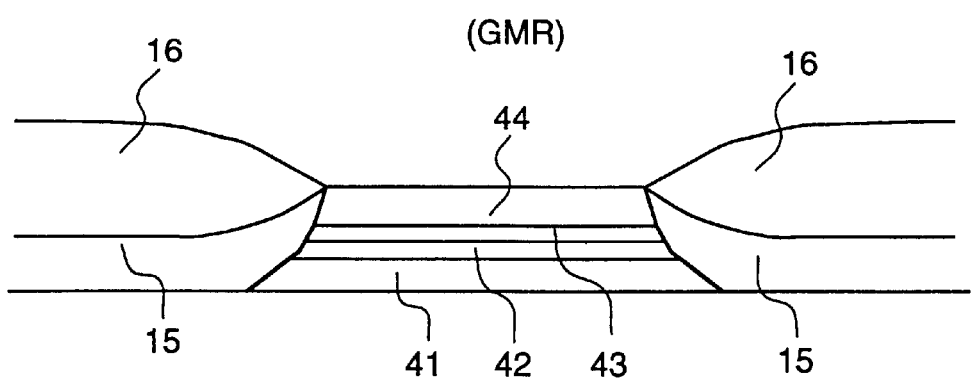

As the magnetoresistive film 14, it is possible to use an AMR film or a GMR film. An example of an element formed using each of the films will be described below. FIG. 2A and FIG. 2B are enlarged views showing the air bearing surfaces near the magnetoresistive film 14 in a read element using the AMR film and the GMR film, respectively. The AMR element was manufactured by laminating the AMR film 31 made of a permalloy film having a thickness of 15 nm, a isolation spacer 32 made of Ta having a thickness of 5 nm and an SAL 33 made of an Ni—Fe—Cr film having a thickness of 15 nm, and cutting both sides of the laminating film so as to obtain a required width. Magnetic domain control layers 15 composed of a Co—Cr—Pt film and an under layer film were arranged on both sides of the AMR film in order to control the magnetic domain of the AMR film 31. Leads 16 electrically connected to the AMR film 31 were laminated on the magnetic domain control layers 15. The GMR element was manufactured by laminating a first ferromagnetic film 41 formed by laminating a permalloy film having a thickness of 5 nm and a Co film having a thickness of 1 nm, a non-magnetic conductive film 42 made of a Cu film having a thickness of 2 nm, a second ferromagnetic film 43 made of a Co film having a thickness of 3 nm and an anti-ferromagnetic film 44 made of an Fe—Mn film having a thickness of 10 nm for fixing the magnetization direction of the second ferromagnetic film 43, and cutting both sides of the laminating film so as to obtain a required width. A unidirectional magnetic anisotropy is applied to the second ferromagnetic film 43 by the anti-ferromagnetic film 44 so that the magnetization direction of the second ferromagnetic film 43 is orientated toward the air bearing surface (the paper surface of the figure). Magnetic domain control layers 15 and leads 16 were arranged on both sides of the laminating film, similar to the case of the AMR element. Although the present invention can be applied to both the AMR element and the GMR element, hereinafter only examples using the GMR element will be described. Use of the GMR element will be more prevelant in the future because of its high sensitivity, but, on the other hand, the GMR element is strongly affected by instability of the shield due to the high sensitivity.

Figure 3:
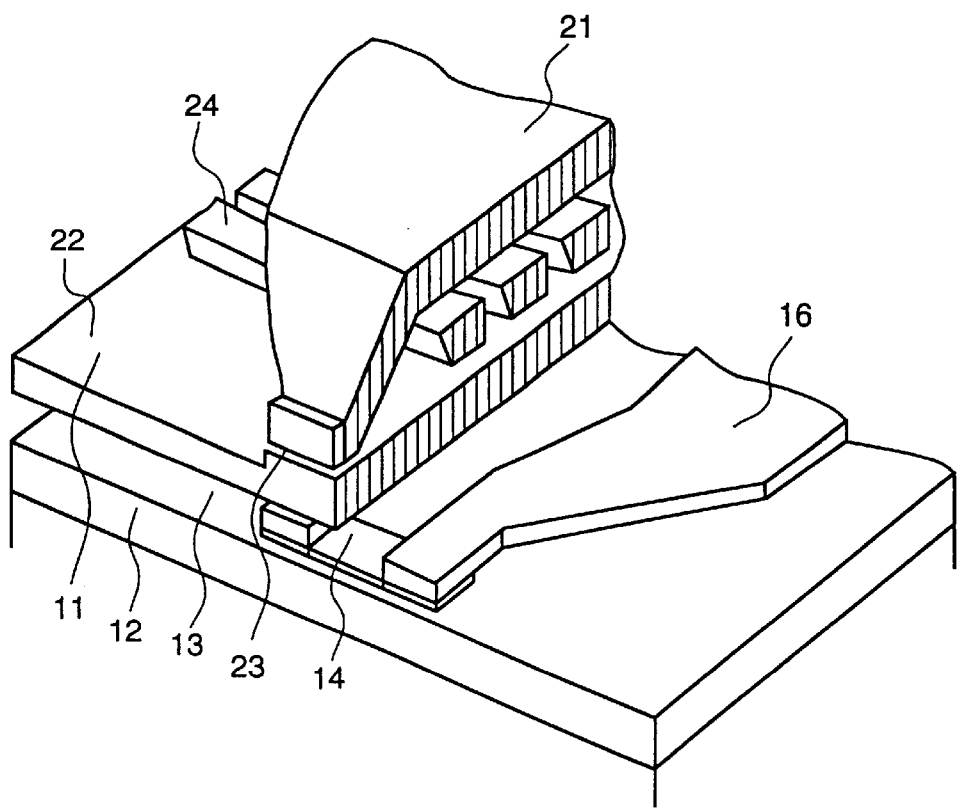
FIG. 3 is a perspective view showing a read-write head of magnetoresistive effect type in accordance with the present invention.

FIG. 3 is a perspective view showing an embodiment of a read-write head of magnetoresistive effect type in accordance with the present invention. A writing operation is performed by collecting a magnetic flux, which is generated by supplying a write current to the coil 24, using the upper core 21 and the upper shield 11 (also serving as the lower core 22), and applying a magnetic field generated from the write gap 23 to the medium. At that time, the magnetization direction of the upper magnetic core 21 and the upper shield 11 is largely changed because of the large amount of magnetic flux being carried. If the value of the anisotropy field of the film is low, the magnetic domain structure is sometimes changed before and after the writing operation.

Since the upper magnetic core 21 and the coil 24 having a complex shape are laminated on the upper shield, a complex stress is particularly applied onto the upper shield 11. Therefore, in a case of using a film having a large magneto-striction, the magnetic anisotropy induced by the stress becomes larger than the intrinsic magnetic anisotropy so as to sometimes form a complex magnetic structure. For this reason, in a conventional read-write head using permalloy for the upper shield, there are some cases where the waveform fluctuation is suddenly increased (for example, a coefficient of variation of the output amplitude defined as a standard deviation of the output divided by the average value becomes 5 to 10%) particularly when the shield-to-shield spacing (the thickness of the reading gap 13) is narrowed below 0.2 $\mu$m.

In order to avoid the waveform fluctuation, it is effective 1) to increase the intrinsic magnetic anisotropy and 2) to use a film having a low magneto-striction. However, when the intrinsic magnetic anisotropy is increased too high, the magnetic permeability is decreased and accordingly the function as a soft magnetic film is decreased. Since the permeability defined by the saturation magnetic flux density/anisotropy field is required to be larger than 500, it is preferable that the anisotropy field is below 20 Oe when the saturation magnetic flux density is 1 tesla, and that the anisotropy field is below 30 Oe when the saturation magnetic flux density is 1.5 tesla. In the present embodiment, since the upper shield 11 was formed of a $Ni_{74}Fe_{16}Co_{10}$ film, the anisotropy field was 10 Oe and could be increased to several times as large as that of the conventional permalloy (3 to 4 Oe). Since the magneto-striction was also small, such as in the order of $10^{-7}$, the coefficient of variation of the output amplitude was decreased to always several percentage and could be reduced to a level where there is practically no problem.

[Embodiment 2]

Figure 4:
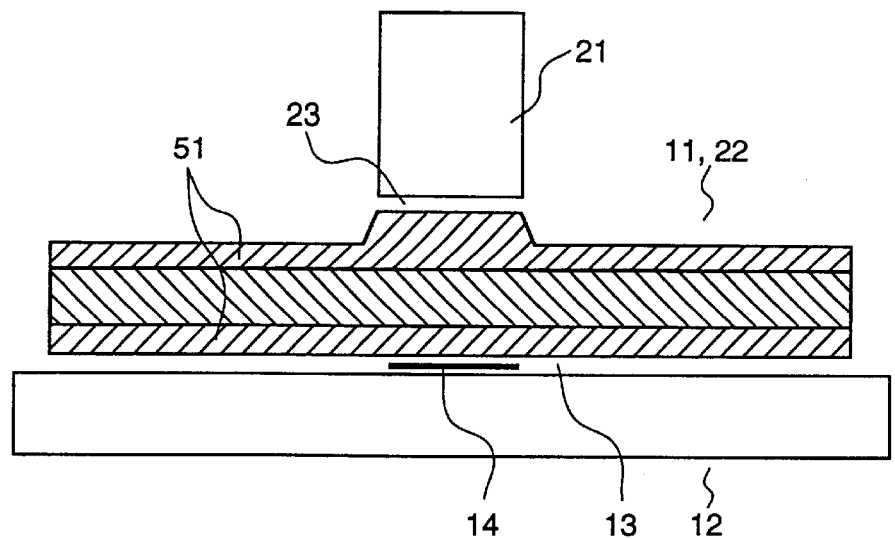
FIG. 4 is a side view partly in section showing the air bearing surface of a read-write head of magnetoresistive effect type in accordance with the present invention.
Figure 5:
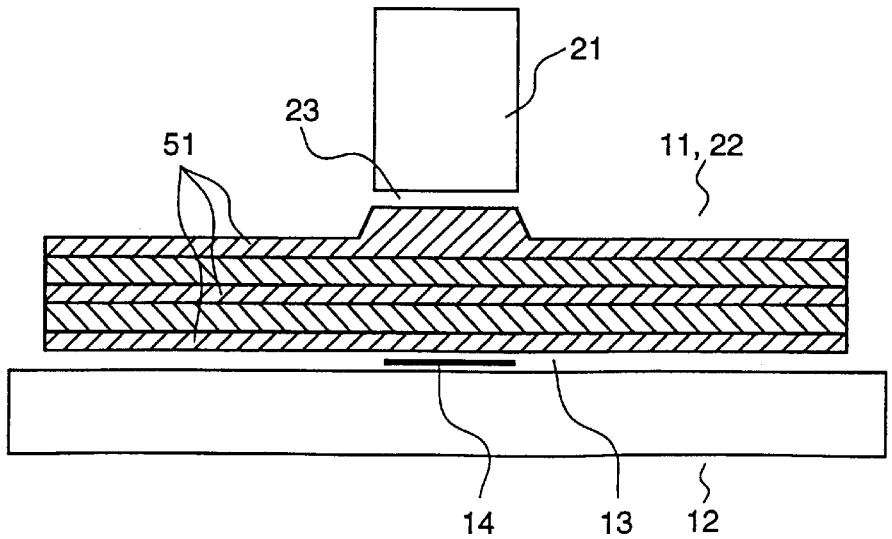
FIG. 5 is a side view partly in section showing the air bearing surface of a read-write head of magnetoresistive effect type in accordance with the present invention.

Although the upper shield 11 is constructed of one film in Embodiment 1, the upper shield may be constructed as a multilayer element including a high anisotropy field soft magnetic film 51 having a magnitude of anisotropy field of 5 to 30 Oe as shown in FIG. 4. Similarly to Embodiment 1, a film having a low magneto-striction is preferable. However, the thickness per layer of the high anisotropy field soft magnetic film 51 can be thinned in the case of the present embodiment, and the selection range of applicable films can be widened. It is known that an Ni—Fe—Co group alloy has a generally increased anisotropy field and magnetic coercive force as the content of Co is increased, but the degree of the increase in the magnetic coercive force is low when the thickness is thin. Therefore, it is possible to use a film containing more Co than the previous embodiment and having a high anisotropy field. As an example here, $Ni_{66}Fe_{14}Co_{20}$ films having a thickness of 0.5 $\mu$m were applied to the uppermost layer and the lowermost layer of the upper shield 11. Permalloy is employed for the middle layer. In the case of using this head, the coefficient of variation of the output amplitude is also always several percentage and can be reduced to a level where there is practically no problem. Similarly, a $Co_{90}Fe_{10}$ film and a $Co_{46}Ni_{27}Fe_{16}Pd_{11}$ film, the magnetic coercive force of which is apt to be increased when the thickness is thick, may be used for the high anisotropy field soft magnetic film 51. The thickness per layer of the high anisotropy field soft magnetic film 51 is preferably 0.1 $\mu$m to 1 $\mu$m. When the film thickness is thin, it is effective to laminate many layers as shown in FIG. 5. On the contrary, when the thickness can be made thick, the high anisotropy field soft magnetic film 51 may be applied to only the uppermost layer or the lowermost layer of the upper shield 11 in order to simplify the process. The high anisotropy field soft magnetic film 51 applicable to the present embodiment is, for example, an Ni—Fe—Co based alloy film containing Ni:Fe:Co=(80+a):(20−a):(1 to 25) where the range of a is 0 to 10, a Co—Fe—Ni based alloy film containing Co:Fe:Ni=(90+b):(10−b):(1 to 30) where the range of b is 0 to 5, or a Co—Ni—Fe—Pd based alloy film containing Co=30 to 70%, Ni=10 to 40%, Fe=5 to 25%, Pd=5 to 20%.

[Embodiment 3]

Figure 6:
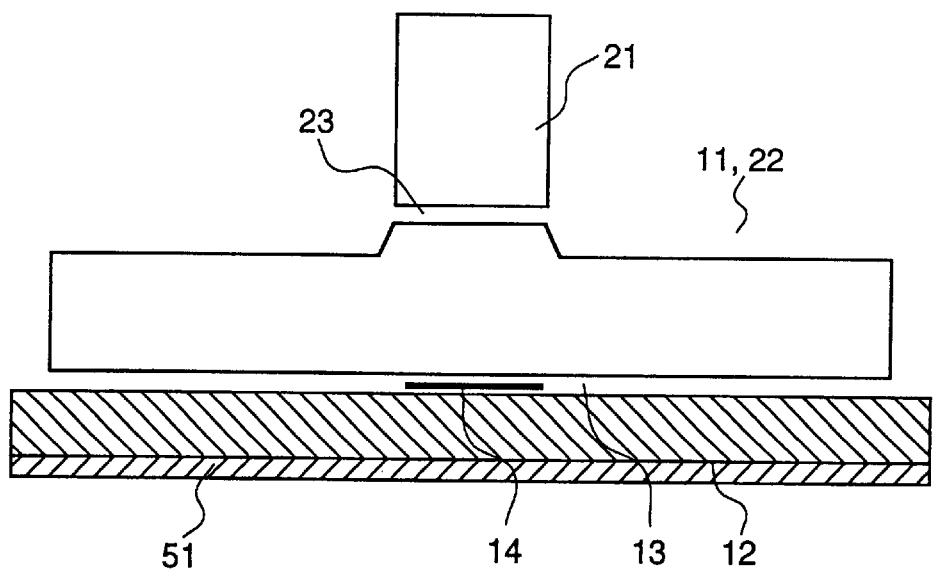
FIG. 6 is a side view partly in section showing the air bearing surface of a read-write head of magnetoresistive effect type in accordance with the present invention.

In this embodiment, the lower shield 12 was formed by laminating a sendust film having a thickness of 2.7 $\mu$m and a $Co_{46}Ni_{27}Fe_{16}Pd_{11}$ film of the high anisotropy field soft magnetic film 51 having a thickness of 0.3 $\mu$m. The high anisotropy field soft magnetic film 51 is arranged in the lowermost layer of the lower shield 12, as shown in FIG. 6. Therein, the high anisotropy field soft magnetic film 51 may be arranged not only in the lowermost layer, but also in the uppermost layer or in both layers. The sendust film has an advantage in that a part of the film is hardly pealed off to attach onto the other portions during the process of polishing the air bearing surface since the film is hard, but the anisotropy field is as low as several Oe which is lower than one-half of that of permalloy. Accordingly, the sendust is apt to be affected by stress and the magnetic domain structure is unstable. Therefore, in a head using the sendust film in the lower shield 12, waveform fluctuation sometimes occurs. However, in the present embodiment, the lower shield film 12 was formed using the laminated film formed of the sendust film and the high anisotropy field soft magnetic film 51, the coefficient of variation of the output amplitude could be reduced to a level where there is no practical problem of several percentages. Further, in order to suppress the waveform fluctuation caused by the upper shield at the same time, it is effective to stabilize both shields using the high anisotropy field soft magnetic film 51. Therein, the same kind of films may be used for the high anisotropy field soft magnetic film 51, or different kinds of films may be used for the high anisotropy field soft magnetic film 51.

[Embodiment 4]

Figure 7:
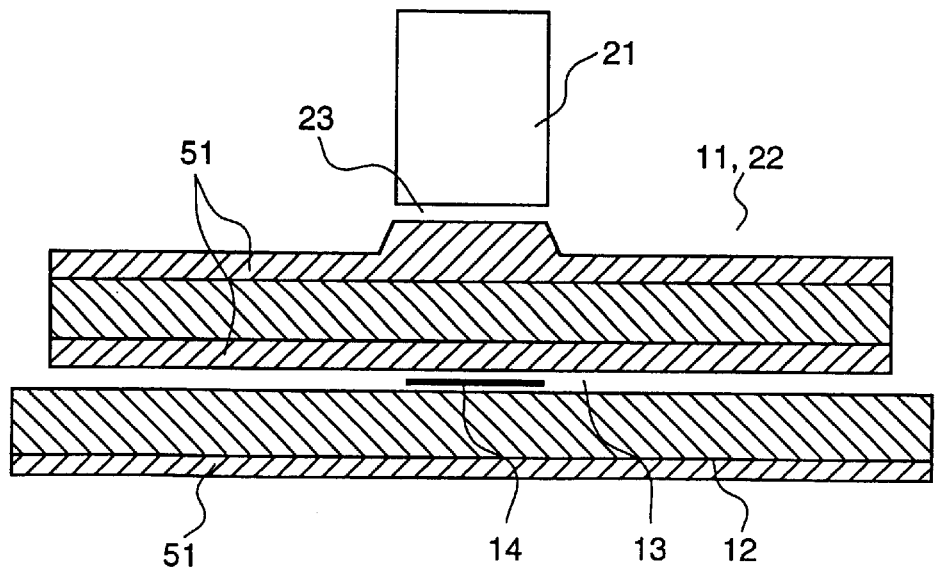
FIG. 7 is a side view partly in section showing the air bearing surface of a read-write head of magnetoresistive effect type in accordance with the present invention.

Although the lower shield 12 in the preceding embodiments is constructed using crystalline materials, it is preferable to employ an amorphous film having a flatter film surface in order to improve the characteristic of the GMR element. However, there has been a disadvantage in that noise-after-write sometimes occurs when an amorphous film is used. Therefore, in the present embodiment, the $Co_{46}Ni_{27}Fe_{16}Pd_{11}$ film of the high anisotropy field soft magnetic film 51 having a thickness of 0.3 $\mu$m was applied to the lowermost layer of the lower shield 12. The other portion of the lower shield 12 was formed of an amorphous Co—Nb—Zr film, and the total thickness was set to 3 $\mu$m. In the present embodiment, the probability of occurrence of noise-after-write was reduced to 1/100 of a conventional level. Therefore, in order to suppress both waveform fluctuation and noise-after-write, it is effective to stabilize both shields using the high anisotropy field soft magnetic film 51, as shown in FIG. 7. Therein, the same kind of films may be used for the high anisotropy field soft magnetic film 51, or different kinds of films may be used for the high anisotropy field soft magnetic film 51.

[Embodiment 5]

Figure 8:
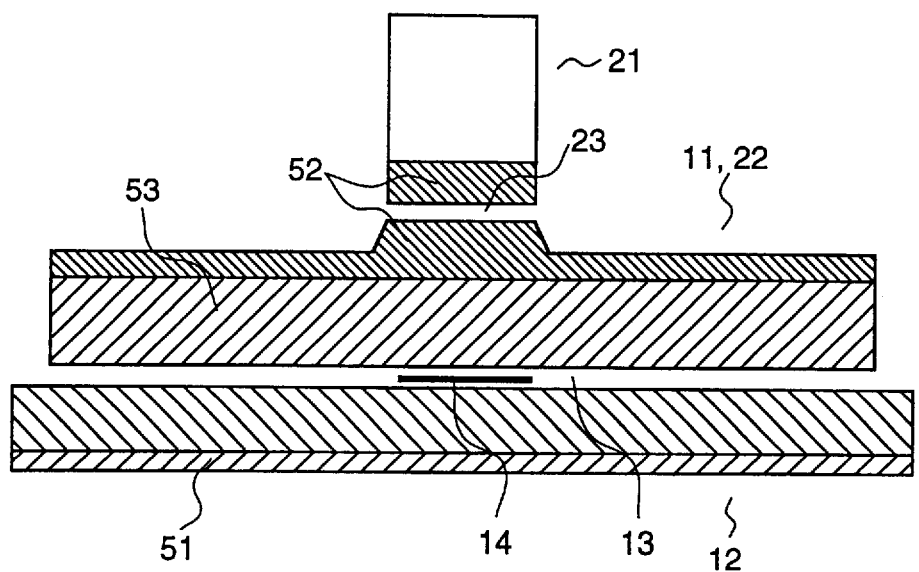
FIG. 8 is a side view partly in section showing the air bearing surface of a read-write head of magnetoresistive effect type in accordance with the present invention.

In the preceding embodiments, the upper magnetic core 21 is made of permalloy. In order to improve the writing performance, it is effective to construct the whole of the upper magnetic core 21 or a part of the upper magnetic core on the side of the write gap 23 using a high saturation magnetic flux density film 52, as shown in FIG. 8. In addition to this, in a case where the writing performance needs to be further improved, it is effective to construct the whole of the upper shield 11 or a part of the upper shield on the side of the write gap 23 using the high saturation magnetic flux density film 52. However, the commonly known high saturation magnetic flux density film having a saturation magnetic flux density higher than 1.2 tesla has a magneto-striction as high as, in the order of, $10^{-6}$, and accordingly it has been difficult to produce compatibility between improving the writing performance and suppressing the waveform fluctuation. In order to satisfy these conditions, it is important to suppress the thickness of the high saturation magnetic flux density film to a necessary and minimum value. However, fluctuation characteristics of a read-write head having an upper shield 11 laminating a high saturation magnetic flux density film 52 made of $Fe_{55}Ni_{45}$ having a film thickness of 0.5 μm and a saturation magnetic flux density of approximately 1.7 tesla and a permalloy film having a film thickness of 2.5 μm and a magneto-striction of the order of $10^{-7}$ was not preferable and the coefficient of variation of the output amplitude was about 5%.

Therefore, in order to make the sign of the magneto-striction of the whole film of the multilayer film forming the upper shield 11 negative, a film 53 having a negative magneto-striction with a single film such as $Ni_{90}Fe_{10}$ instead of the permalloy film was employed. By doing so, the coefficient of variation of the output amplitude was decreased to several percentage and could be reduced to a level where there is practically no problem. The high saturation magnetic flux density film 52 applicable to the present embodiment is, for example, an Fe—Ni based alloy film containing Fe:Ni=(55+d):(45−d) where the range of d is −10 to +10, or a Co—Ni—Fe based alloy film containing Co=20 to 80%, Ni=10 to 40% and Fe=10 to 40%, or a Co—Ni—Fe—Pd based alloy film containing Co=30 to 70%, Ni=10 to 40%, Fe=5 to 25%, Pd=5 to 20%. The film 53 having a negative magneto-striction applicable to the present embodiment is, for example, an Ni—Fe based alloy film containing Ni:Fe=(83+e):(17−e) where the range of e is 0 to 10, or an Ni—Fe—Co based alloy film containing Ni:Fe:Co=(83+e):(17−e):(1 to 25) where the range of e is 0 to 10. When the magnitude of the anisotropy field of the high saturation magnetic flux density film 52 is as large as more than 10 Oe, it is preferable in some cases that a Ni—Fe—Co based alloy film having a large anisotropy field is applied to the film 53 having a negative magneto-striction.

Figure 9:
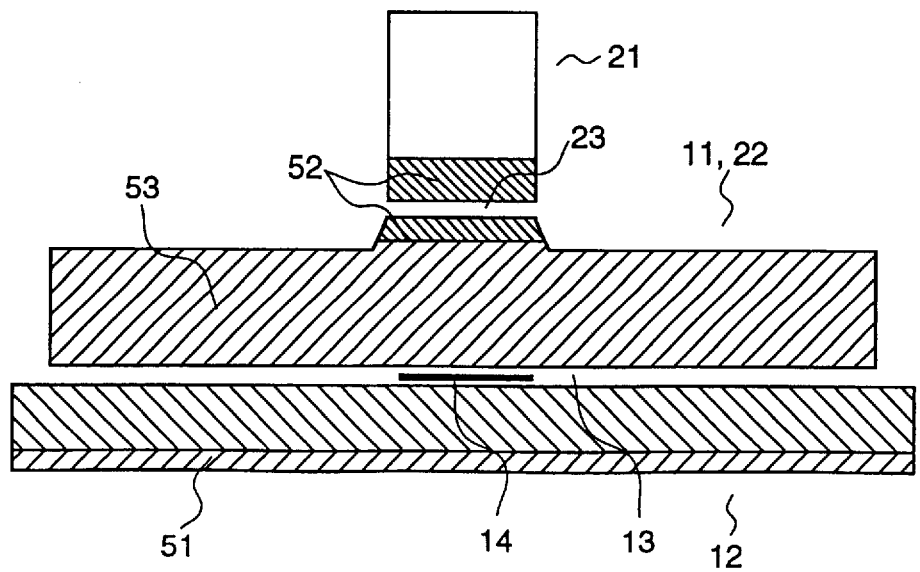
FIG. 9 is a side view partly in section showing the air bearing surface of a read-write head of magnetoresistive effect type in accordance with the present invention.

When the composition and film thickness of a multilayer film composing the upper shield 11 are selected, it is preferable that the sign of the magneto-striction of the multilayer film arranged just below the recording gap 23 is negative and the magnitude is in the order of $10^{-7}$. One method satisfying this is that the component of the multilayer film in the average value over the film thickness direction is set to Ni:Fe:Co=(80+a):(20−a):(1 to 25) where the range of a is 0 to 10, or Co:Fe:Ni=(90+b):(10−b):(1 to 30) where the range of b is 0 to 5, or Ni:Fe=(80+c):(20−c) where the range of c is 1 to 10. Further, in order to lessen the effect of the anisotropy induced by stress as much as possible, it is preferable that the multilayer film described above includes a soft magnetic film having a magnitude of anisotropy field larger than 5 Oe and smaller than 30 Oe. It is not necessary for the high saturation magnetic flux density film 52 to exist over the whole width direction of the upper shield 11, but only the projecting portion just below the write gap 23 may be constructed using the high saturation magnetic flux density film 52, as shown in FIG. 9. Further, the lower shield 12 of FIG. 8 and FIG. 9 was constructed with a multilayer film composed of a $CO_{46}Ni_{27}Fe_{16}Pd_{11}$ film of the aforementioned high anisotropy field soft magnetic film 51 and an amorphous Co—Nb—Zr film.

As described above, according to the present invention, the magnetic domain of the shield can be stabilized without using any anti-ferromagnetic film because the shield is constructed using the soft magnetic film having a comparatively large anisotropy field or because the shield is constructed by laminating a soft magnetic film having a positive magneto-striction and a soft magnetic film having a negative magneto-striction. Therefore, it is possible to comparatively easily provide a read-write head capable of suppressing the reproduced waveform fluctuation and the noise-after-write, thereby to suppress occurrence of errors in the operation of the magnetic writing apparatus.

[Embodiment 6]

Figure 10:
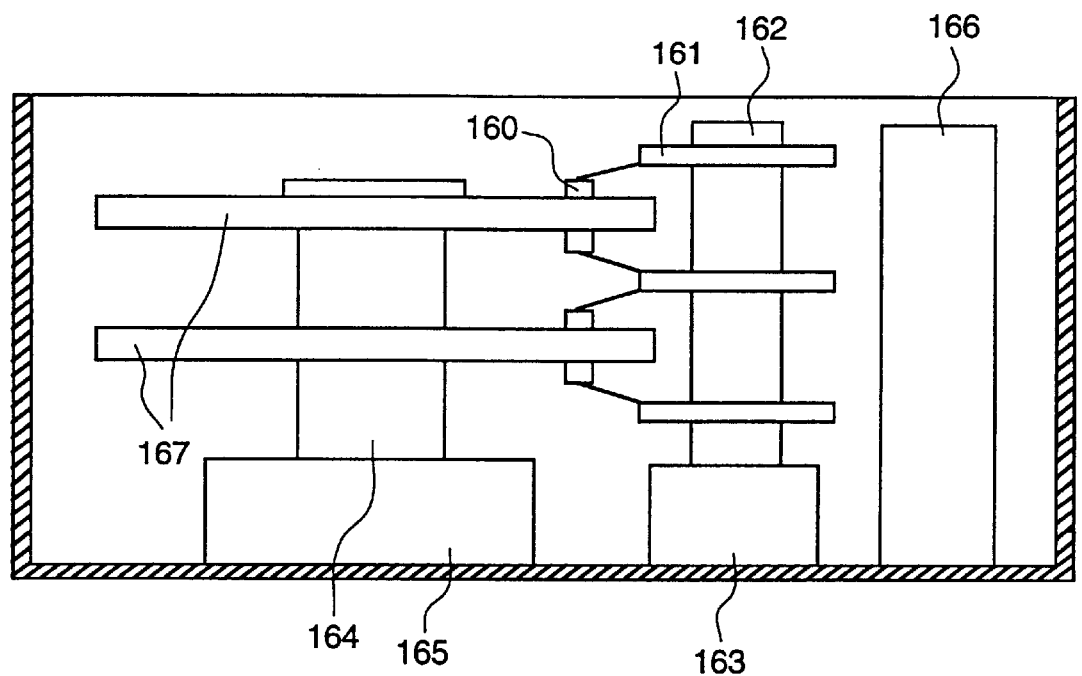
FIG. 10 is a schematic diagram showing a hard disk device using read-write heads.

FIG. 10 is a schematic view showing a hard disk device using the read-write heads described in Embodiments 1 to 5. The device has a disk rotating shaft 164 and a spindle motor 165 for rotating the disk rotating shaft at a high speed, and one or more (two in this embodiment) disks 167 are attached to the disk rotating shaft 164 with a spacing between them. Therefore, both of the disks 167 are rotated together with the disk rotating shaft 164. The disk is a circular plate having a predetermined radius and thickness, and has permanent magnet films on both surfaces which function as information storing surfaces. The device also has a head positioning rotating shaft 162 outside the disk 167 and a voice coil motor 163 for driving the head positioning rotating shaft 162, and a plurality of access arms 161 are attached to the head positioning rotating shaft 162, and a read-write head (hereinafter referred to as head) 160 is attached in the top end of each of the access arms 161. Each of the heads 160 is moved on each of the disks 167 in the radial direction by rotating the head positioning rotating shaft 162 by a necessary angle to be positioned at a necessary position. Further, each of the heads 160 is kept at a position about several tens nm distant from the surface of the disk by the balance between a buoyant force generated when the disk 167 is rotated at a high speed and a pushing force of an elastic suspension forming a part of the access arm 161. The spindle motor 165 and the voice coil motor 163 are respectively connected to a hard disk controller 166, and the hard disk controller 166 controls the rotating speed of the disks and the position of the head 160.

Figure 11:
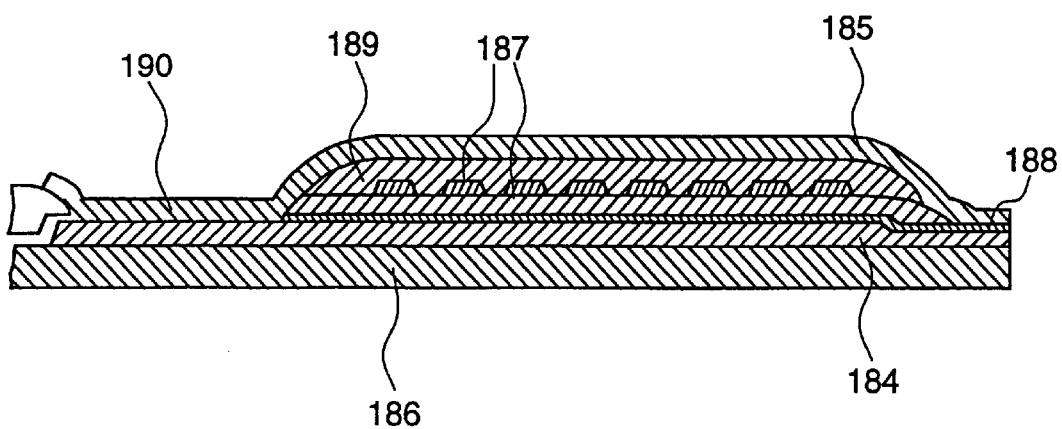
FIG. 11 is a cross-sectional view showing an inductive write head which is used for the hard disk device in accordance with the present invention.

FIG. 11 is a cross-sectional view showing an inductive write head which is used for the hard disk device in accordance with the present invention. The thin film head is composed of an upper shield film 186, a lower magnetic film 184 and a upper magnetic film 185 formed of magnetic films attached on the upper shield film. A non-magnetic insulator 189 is attached between these magnetic films. A part of the insulator determines the magnetic gap. A supporting body is of a slider form having an air bearing surface (ABS), and this is in a buoyant relation sufficient to effect access to the medium of the rotating disk during operation of the disk file.

The thin film magnetic head has a back gap 190 formed by the upper magnetic film 185 and the lower magnetic film 184. The back gap 190 is isolated from the magnetic gap by an inserted coil 187.

The continuous coil 187 is provided as a layer formed on the lower magnetic film 184, for example, by plating, and the coil 187 and the lower magnetic film 184 are magnetically coupled. The coil 187 has an electric contact point in the center of the coil buried with an insulator 189, and similarly the coil 187 has a larger area as an electric contact point at a terminal point in the outer edge portion. The contact points are connected to an external lead wire and a read-write signal head circuit (not shown).

In accordance with the present invention, the coil 187 formed in a single layer is in the form of a slightly distorted ellipsoidal, and a portion having a smaller cross-sectional area is placed at a position nearest to the magnetic gap and the cross-sectional area gradually increases as the distance from the magnetic gap becomes larger.

However, a large number of wires of the ellipsoidal coil are densely inserted between the back gap 190 and the magnetic gap 188, and the width or the cross-sectional diameter of the coil is small in this zone. Further, a substantial decrease in cross-sectional area in the portion far distant from the magnetic gap results in a decrease in the electric resistance. Furthermore, the ellipsoidal (long circular) coil does not have corners nor sharp ends or edges, and accordingly is small in current resistance. In addition to these, the ellipsoidal coil is shorter in total length of conductor compared to a rectangular or circular (ring-shaped) coil. As a result of the advantages, the total resistance of the coil is relatively small, and accordingly heat generation is small, and appropriate heat radiation can be obtained. Since the heat generating rate is substantially decreased, layer collapsing, extension and expansion of the thin film layer can be prevented, and the cause of ball chip projection at the ABS can be removed.

The shape of the ellipsoidal coil, the width of which changes almost uniformly, is attached by an economical conventional technology, such as sputtering or vapor deposition. A coil having the other shape, particularly having corners is apt to have an uneven plated width. Eliminating corners and sharp edges applies a small mechanical stress to the produced coil.

In this embodiment, a nearly ellipsoidal coil having many turns is formed between the magnetic cores, and the cross-sectional diameter of the coil is gradually expanded from the magnetic gap toward the back gap, and therefore, the output of signals is increased and heat generation is decreased.

Figure 12:
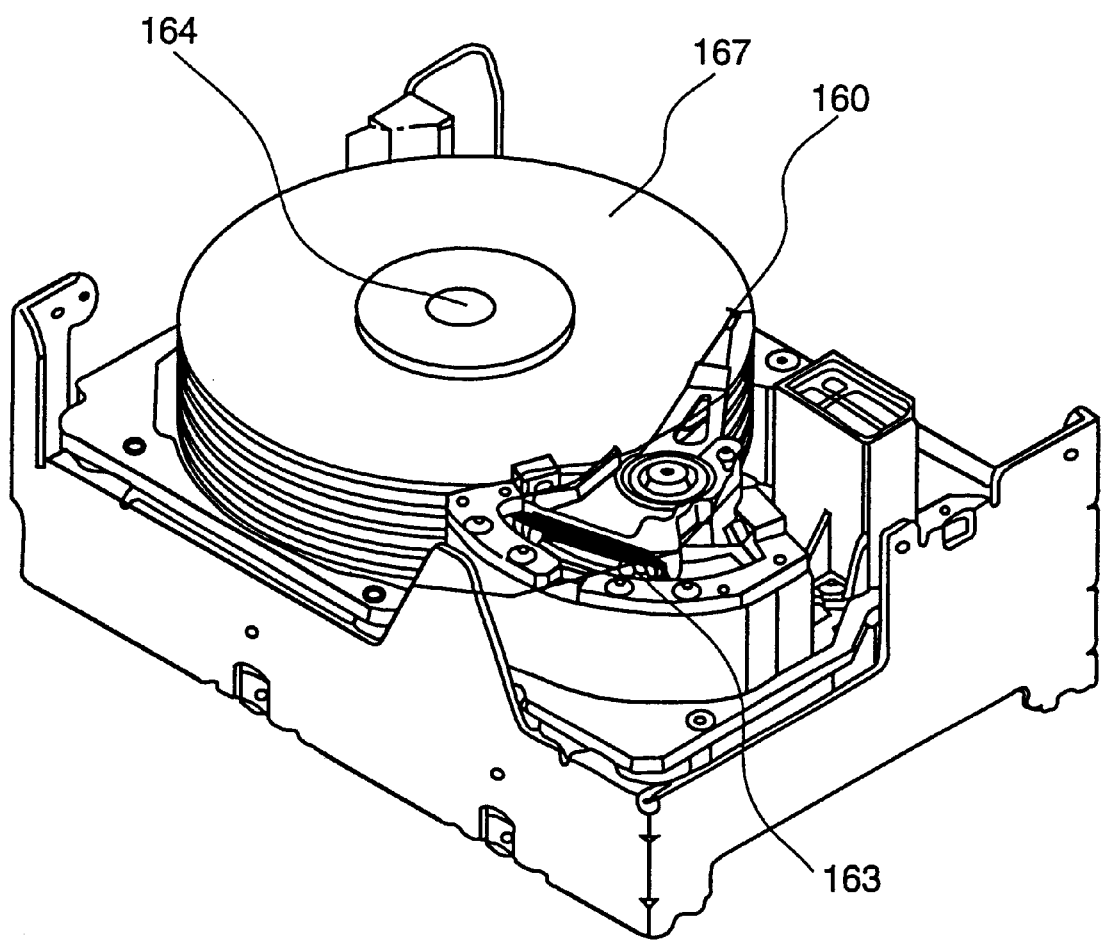
FIG. 12 is a perspective view showing the overall structure of a magnetic disk device in accordance with the present invention.

FIG. 12 is a perspective view showing the overall structure of an embodiment of a magnetic disk device in accordance with the present invention. The construction of the magnetic disk device is composed of magnetic disks 167 for writing information thereon, a DC motor, not shown, for rotating the magnetic disk, a magnetic head 160 for reading and writing the information, and a positioning unit for supporting the magnetic head and changing the position of the magnetic head, that is, an actuator and a voice coil motor 163. In this figure, five magnetic disks are attached to a single rotating shaft to increase the total memory capacity.

According to the present embodiment, since it is possible to write even on a high magnetic coercive force medium in a high frequency band, and to obtain a high sensitive MR sensor having an excellent MR effect, such as a media transmission speed above 15 MB/second, a write frequency above 45 MHz, a high speed transmission of data above a magnetic disk 4000 rpm, shortening of access time, and an increase in writing capacity, a magnetic disk device having a surface writing density above 3 $Gb/in^2$ can be obtained.

What is claimed is:

1. A read-write head comprising an inductive write element for magnetically writing information in a medium; and a magnetoresistive read element for reading said written information by detecting a change in an electric signal produced by a change in a magnetic field leaking from the medium; said inductive write element and said magnetoresistive read element being formed on a single substrate;

said inductive write element comprising a coil for generating a magnetic flux; a pair of magnetic cores for collecting said flux; and a write gap for generating a magnetic field, said write gap being arranged between said pair of magnetic cores;

said magnetoresistive read element comprising a pair of shields formed of soft magnetic films; a magnetoresistive film arranged between said pair of shields; and a pair of leads electrically connected to said magnetoresistive film;

wherein at least one of said pair of shields comprises a soft magnetic film having a magnitude of anisotropy field of 5 to 30 Oe and without an anti-ferromagnetic film therein; and wherein at least one of said pair of shields has an alloy selected from the group consisting of an alloy containing Ni of 80 to 90%, Fe of 10 to 20% and Co of 1 to 25% on the atomic ratio basis as base components; an alloy containing Co of 90 to 95%, Fe of 15 to 10% and Ni of 1 to 30% on the atomic ratio basis as base components; and an alloy containing Co of 30 to 70%, Ni of 10 to 40%, Fe of 5 to 25% and Pd of 5 to 20% on the atomic ratio basis as base components.

2. A read-write head according to claim 1, wherein the shield nearer to said write gap out of said pair of shields has a construction containing an alloy selected from the group consisting of said Ni—Fe—Co based alloy, said Co—Fe—Ni based alloy and said Co—Ni—Fe—Pd based alloy.

3. A read-write head according to claim 1, wherein the shield nearer to said substrate out of said pair of shields has a construction containing an alloy selected from the group consisting of said Ni—Fe—Co based alloy, said Co—Fe—Ni based alloy and said Co—Ni—Fe—Pd based alloy.

4. A read-write head according to any one of claim 1 to claim 3, wherein said magnetoresistive film comprises a first ferromagnetic film having a magnetization direction of which is changed by a magnetic field leaking from said medium; a second ferromagnetic film having a magnetization direction which is almost fixed; and a non-magnetic conductive film inserted between said first ferromagnetic film and said second ferromagnetic film, and said second ferromagnetic film and an anti-ferromagnetic film for fixing the magnetization of the second ferromagnetic film are directly laminated to form a multilayer.

* * * * *